(12) United States Patent
Yasuda

(10) Patent No.: US 10,527,091 B2
(45) Date of Patent: Jan. 7, 2020

(54) SELF-ALIGNING ROLLER BEARING

(71) Applicant: JTEKT CORPORATION, Osaka-shi, Osaka (JP)

(72) Inventor: Hirotaka Yasuda, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/938,754

(22) Filed: Mar. 28, 2018

(65) Prior Publication Data

US 2018/0291951 A1    Oct. 11, 2018

(30) Foreign Application Priority Data

Apr. 7, 2017    (JP) .................................. 2017-076536

(51) Int. Cl.
| F16C 23/08 | (2006.01) |
| F16C 19/38 | (2006.01) |
| F16C 33/36 | (2006.01) |
| F16C 33/46 | (2006.01) |
| F16C 33/49 | (2006.01) |

(52) U.S. Cl.
CPC ............ F16C 23/086 (2013.01); F16C 19/38 (2013.01); F16C 33/4605 (2013.01); F16C 33/4682 (2013.01); F16C 33/497 (2013.01); F16C 33/36 (2013.01); F16C 2240/46 (2013.01)

(58) Field of Classification Search
CPC ........ F16C 19/38; F16C 23/086; F16C 33/36; F16C 33/4605; F16C 33/4682; F16C 33/497; F16C 33/586; F16C 2240/46
See application file for complete search history.

(56) References Cited

U.S. PATENT DOCUMENTS 6,814,494 B2 * 11/2004 Borowski ............. F16C 23/086
  384/484
9,587,676 B2 * 3/2017 Yasuda ............... F16C 33/4605
2016/0290393 A1   10/2016 Yasuda

FOREIGN PATENT DOCUMENTS

| CN | 103790955 A | 5/2014 |
| DE | 10 2016 105698 A1 | 10/2016 |
| JP | 2009 074679 A | 4/2009 |
| JP | 2009 174669 A | 8/2009 |
| JP | 2013 061040 A | 4/2013 |
| JP | 2016-191429 A | 11/2016 |

OTHER PUBLICATIONS

Jun. 6, 2018 Extended European Search Report issued in European Patent Application No. 18165938.4.
Dec. 17, 2018 Office Action issued in European Patent Application No. 18165938.4.

* cited by examiner

*Primary Examiner* — James Pilkington
(74) *Attorney, Agent, or Firm* — Oliff PLC

(57) ABSTRACT

In a self-aligning roller bearing, in a longitudinal section including a center line of a spherical roller and an axis of the self-aligning roller bearing, a clearance X between an outer end surface of a spherical roller on an axially outer side of the self-aligning roller bearing and a rib portion, and a clearance Y between an inner end surface of the spherical roller on an axially inner side of the self-aligning roller bearing and a guide ring have a relation of X<Y.

2 Claims, 5 Drawing Sheets

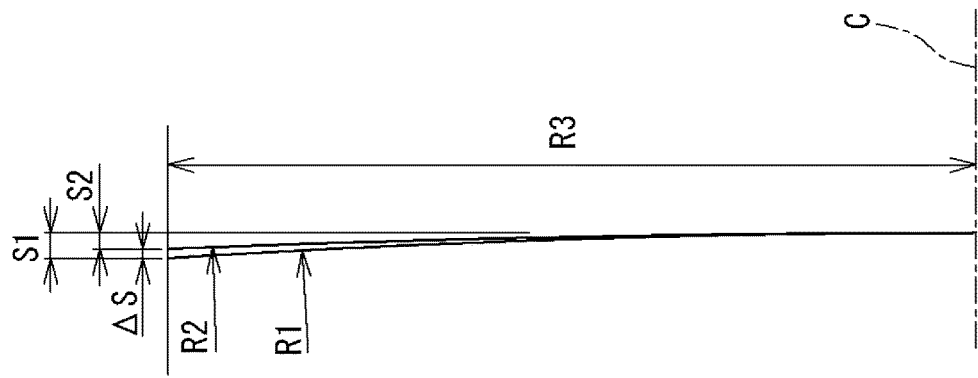
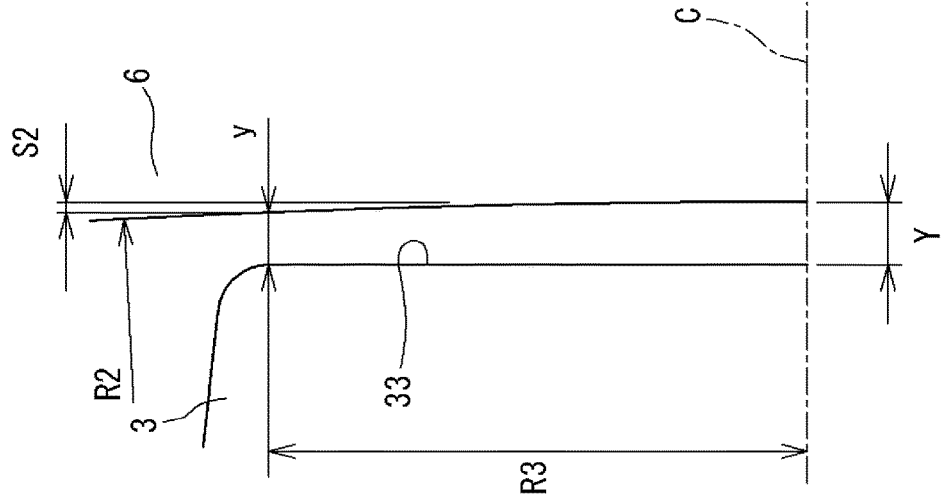
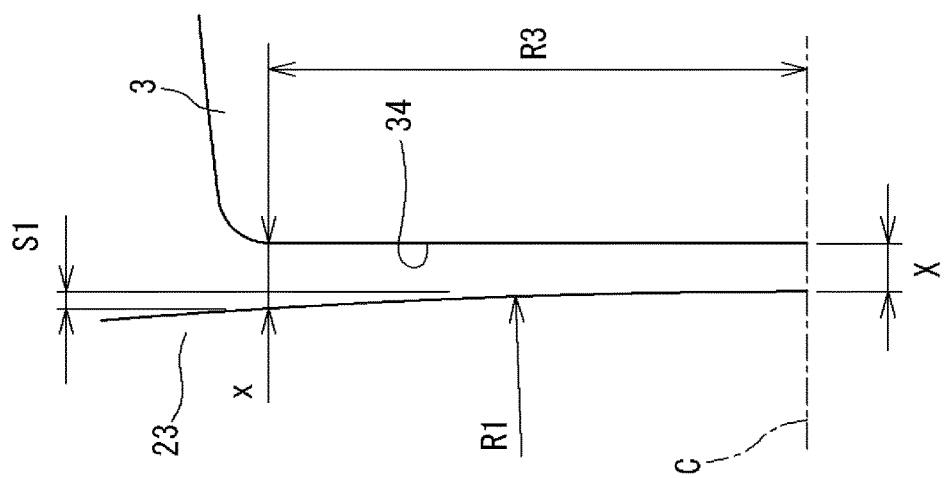

SELF-ALIGNING ROLLER BEARING

INCORPORATION BY REFERENCE

The disclosure of Japanese Patent Application No. 2017-076536 filed on Apr. 7, 2017 including the specification, drawings and abstract, is incorporated herein by reference in its entirety.

BACKGROUND OF THE INVENTION

1. Field of the Invention

The present invention relates to a self-aligning roller bearing.

2. Description of the Related Art

A conventional self-aligning roller bearing described in, for example, Japanese Patent Application Publication No. 2016-191429 (JP 2016-191429 A) has been known. The self-aligning roller bearing includes, for example, an outer ring 81, an inner ring 84, spherical rollers 86, an annular cage 88, and an annular guide ring 90 as illustrated in FIG. 5. The outer ring 81 has an outer raceway surface 82 formed on its inner periphery. The inner ring 8 has two rows of inner raceway surfaces 83 formed side by side on its outer periphery. The spherical rollers 86 are disposed in two rows side by side between the outer raceway surface 82 and the inner raceway surfaces 83. The cage 88 holds a plurality of spherical rollers 86 in each row. The guide ring 90 is disposed between the cage 88 and the inner ring 84 and disposed between the two rows of the spherical rollers 86. The cage 88 is positioned in a radial direction by the guide ring 90.

In the self-aligning roller bearing illustrated in FIG. 5, the spherical rollers 86 rotate about virtual lines L1 (as indicated by arrows r1 and r2) that pass through contact points P1 and P2 at which the spherical rollers 86 contact the outer raceway surface 82 and the inner raceway surfaces 83.

As a result, the spherical rollers 86 may be skewed. In this case, end surfaces 86a of the spherical rollers 86 may contact outer surfaces 90b of the guide ring 90, or the guide ring 90 may be sandwiched between the spherical rollers 86 disposed on both sides in the axial direction. The guide ring 90 is generally formed of a material with hardness lower than that of the spherical rollers 86. Thus, problems such as wear of the guide ring 90 may arise due to contact between the guide ring 90 and the spherical rollers 86.

SUMMARY OF THE INVENTION

One object of the present invention is to provide a self-aligning roller bearing configured to prevent spherical rollers from contacting a guide ring due to skewed spherical rollers.

A self-aligning roller bearing according to one aspect of the present invention includes an outer ring having an outer raceway surface that is a recessed curve on an inner periphery of the outer ring, an inner ring having two rows of inner raceway surfaces that are recessed curves side by side on an outer periphery of the inner ring and having a rib portion on opposite sides in an axially outward direction, a plurality of spherical rollers disposed between the outer raceway surface and the inner raceway surface in two rows side by side, a cage having a plurality of pockets that accommodate the spherical rollers to hold each row of the spherical rollers at intervals in the circumferential direction, and a guide ring disposed between the cage and the inner ring and disposed between the two rows of the spherical rollers. In a longitudinal section including a center line of the spherical roller and an axis of the self-aligning roller bearing, a clearance X between an outer end surface of the spherical roller arranged on an axially outer side of the self-aligning roller bearing and the rib portion, and a clearance Y between an inner end surface of the spherical roller arranged on an axially inner side of the self-aligning roller bearing and the guide ring are configured to have a relation of X<Y.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4A is a view illustrating a variation in a clearance between the spherical roller and a rib portion in a portion B in FIG. 3;

FIG. 4B is a view illustrating a variation in a clearance between the spherical roller and the guide ring in a portion D in FIG. 3;

FIG. 4C is an explanatory view illustrating a difference in a variation amount of the clearance.

DETAILED DESCRIPTION OF EMBODIMENTS

Figure 1:
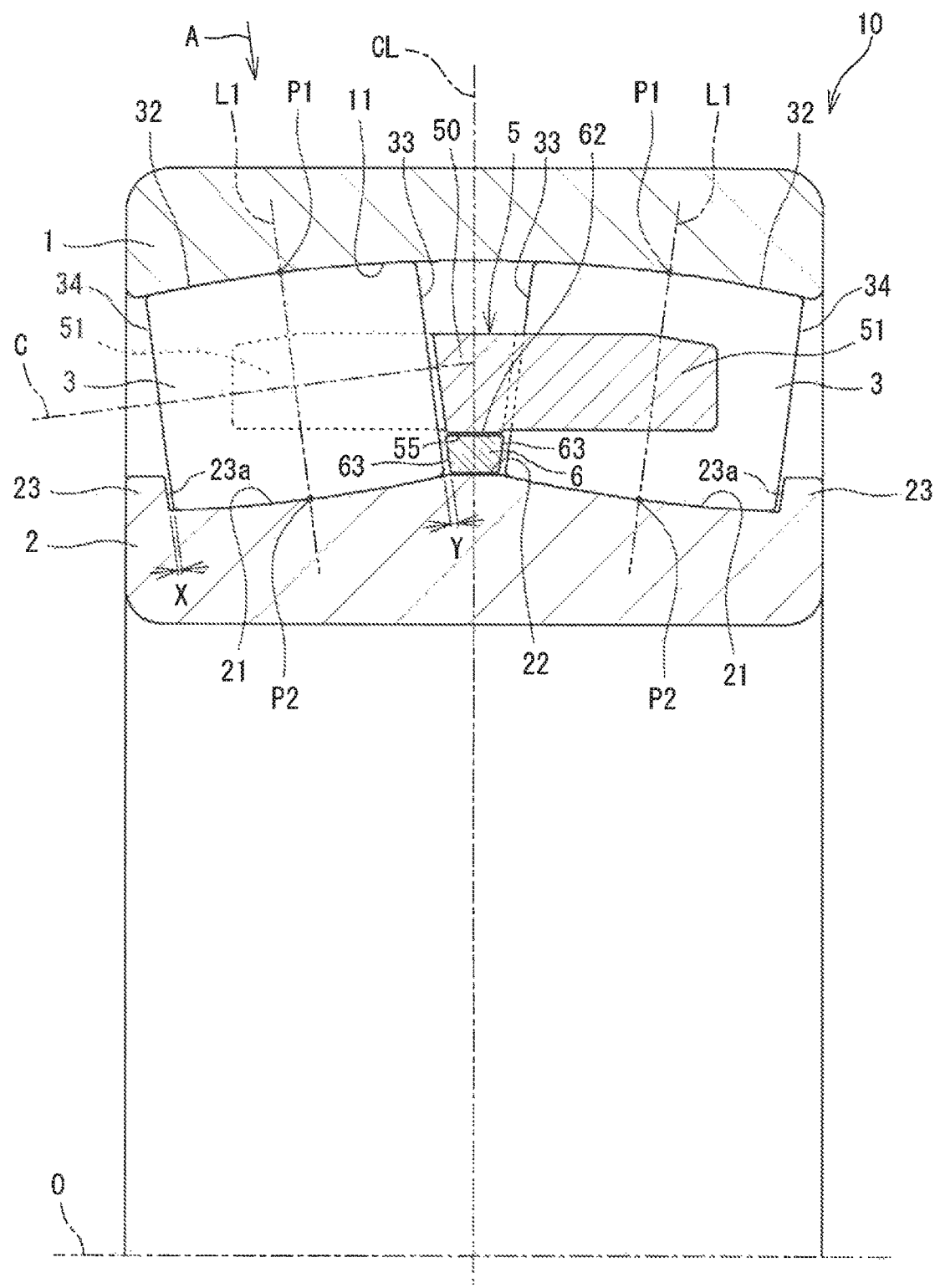
FIG. 1 is a longitudinal sectional view of a self-aligning roller bearing according to an embodiment of the invention.

FIG. 1 is a longitudinal sectional view of a self-aligning roller bearing according to an embodiment of the present invention. The self-aligning roller bearing 10 includes an outer ring 1, an inner ring 2, a plurality of spherical rollers 3, a cage 5, and an annular guide ring 6. The outer ring 1 and the inner ring 2 are disposed concentrically. Spherical rollers 3 are disposed between the outer ring 1 and the inner ring 2 in two rows side by side. The cage 5 holds each row of the spherical rollers 3 at intervals in a circumferential direction. The guide ring 6 is disposed between the cage 5 and the inner ring 2 and disposed between the two rows of the spherical rollers 3. In the specification, the direction toward or the side closer to a center line CL in the axial direction of the self-aligning roller bearing 10 may be referred to as "axially inward" or "axially inner side", and the direction away from or the side farther from the center line CL in the axial direction of the self-aligning roller bearing 10 may be referred to as "axially outward" or "axially outer side".

The outer ring 1 is formed in line symmetry with respect to the center line CL. A single outer raceway surface 11 is formed on the inner periphery of the outer ring 1. The outer raceway surface 11 is a recessed curve shaped along (a part of) a spherical surface with a predetermined radius centering on an intersection point between an axis O of the self-aligning roller bearing 10 and the center line CL. Thus, as illustrated in FIG. 1, the outer raceway surface 11 has an arc shape as viewed in section including the axis O of the self-aligning roller bearing 10, that is, as viewed in a longitudinal section.

The inner ring 2 is also formed in line symmetry with respect to the center line CL. Two rows of inner raceway surfaces 21 are formed side by side on the outer periphery of the inner ring 2. The inner raceway surfaces 21 are recessed curves. As illustrated in FIG. 1, both inner raceway surfaces 21 have arc shapes as viewed in the longitudinal section of the self-aligning roller bearing 10. The radii of the inner raceway surfaces 21 are equal to the radius of (a part of) the spherical surface of the outer raceway surface 11 of the outer ring 1. A cylindrical surface 22 is formed on the outer peripheral surface of the inner ring 2 between the inner raceway surfaces 21, 21. The cylindrical surface 22 is in parallel to the axis O of the self-aligning roller bearing 10. The inner ring 2 has, on the axially outer sides of the inner raceway surfaces 21, rib portions 23 that prevent the spherical rollers 3 from falling off.

The barrel-shaped spherical rollers 3 have outer peripheral surfaces 32 that are projected curves and that roll along the outer raceway surface 11 and the inner raceway surfaces 21. The spherical rollers 3 are arranged between the outer raceway surface 11 of the outer ring 1 and the inner raceway surfaces 21 of the inner ring 2 in two rows side by side, each row arranged along the circumferential direction.

The cage 5 has an annular shape as a whole and has an annular member 50 in the center and a plurality of prongs (cage bars) 51. The prongs (cage bars) 51 extend axially outward from both axially outer sides of the annular member 50 and are arranged at intervals in the circumferential direction. The annular member 50 is formed integrally with the prongs 51. The prongs 51 that extend from the annular member 50 to one side in the axial direction and the prongs 51 that extend from the annular member 50 to the other side in the axial direction are offset from each other in the circumferential direction by a half pitch. A pocket is formed between any two of the prongs 51 adjacent to each other in the circumferential direction to accommodate the spherical roller 3. The cage 5 holds each row of the spherical rollers 3 at predetermined intervals in the circumferential direction.

Figure 2:
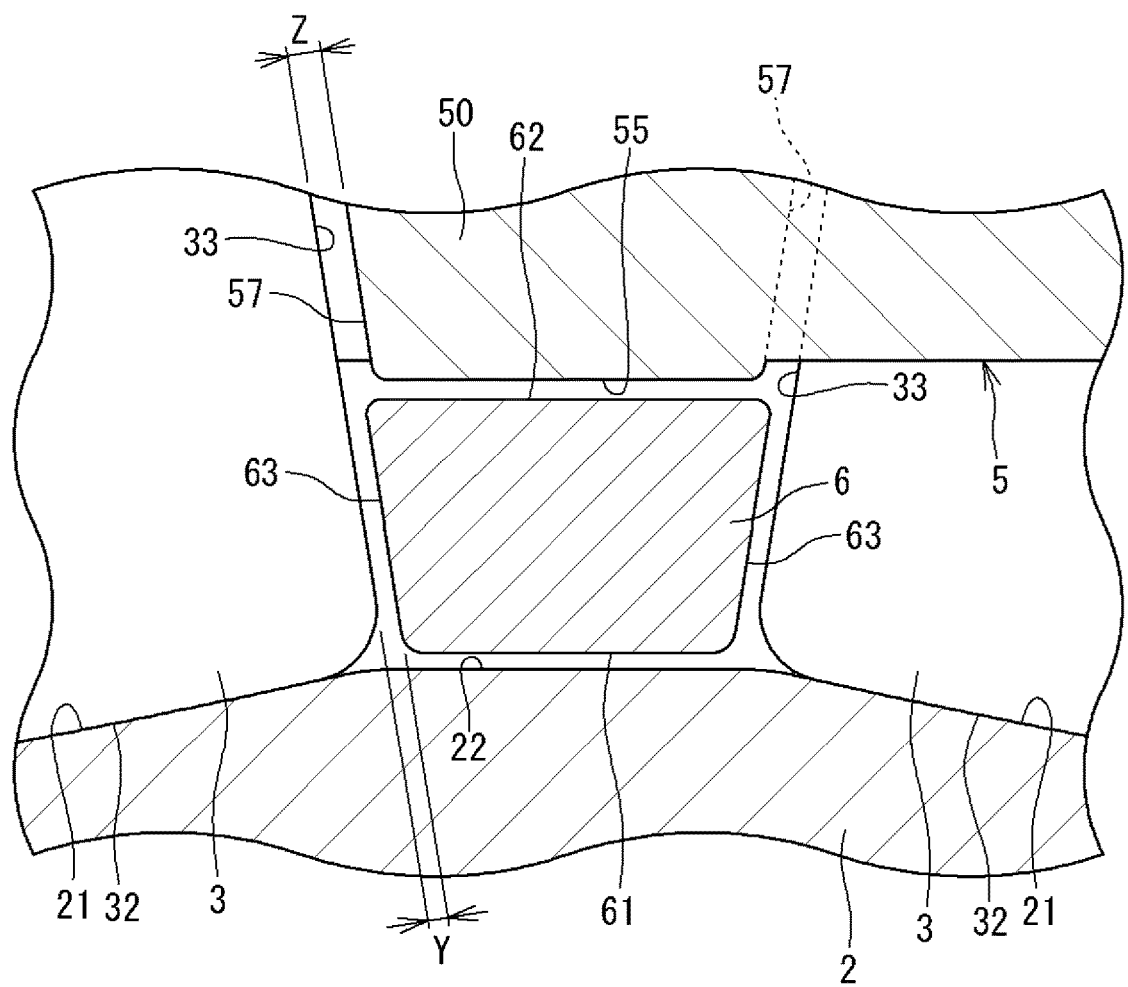
FIG. 2 is an enlarged sectional view of a guide ring and its periphery.

FIG. 2 is an enlarged sectional view of the guide ring 6 and its periphery. The guide ring 6 is an annular member and disposed between the annular member 50 of the cage 5 and the inner ring 2 and between the two rows of the spherical rollers 3. The guide ring 6 is disposed radially outward of the cylindrical surface 22 of the inner ring 2 and radially inward of the annular member 50 of the cage 5. A clearance is provided between an inner peripheral surface 61 of the guide ring 6 and the cylindrical surface 22 of the inner ring 2. A clearance is also provided between an outer peripheral surface 62 of the guide ring 6 and an inner peripheral surface 55 of the annular member 50. Thus, the guide ring 6 is positioned with a slight moving margin from the cylindrical surface 22 in the radial direction. The cage 5 is positioned with a slight moving margin from the guide ring 6 in the radial direction.

With the cage 5, the inner ring 2, and the guide ring 6 arranged coaxially with each other, the inner peripheral surface 55 of the annular member 50 and the outer peripheral surface 62 of the guide ring 6 each form a cylindrical surface centering on the axis O (see FIG. 1) of the self-aligning roller bearing 10. A clearance is provided in the radial direction between the inner peripheral surface 55 of the annular member 50 and the outer peripheral surface 62 of the guide ring 6. A clearance is also provided in the radial direction between the cylindrical surface 22 of the inner ring 2 and the inner peripheral surface 61 of the guide ring 6. This enables the guide ring 6 to rotate independent of the inner ring 2 and the cage 5.

The outer ring 1, the inner ring 2, and the spherical rollers 3 in the present embodiment are made of bearing steel or the like. The guide ring 6 is made of cast iron. The cage 5 is made of brass. The parts may, however, be made of other metals.

As illustrated in FIG. 1, a clearance X is provided between an axially outer end surface 34 (hereinafter simply referred to as "outer end surface 34") of each spherical roller 3 and an axially inner side surface 23a (hereinafter simply referred to as "inner surface 23a") of the corresponding one of the rib portions 23 of the inner ring 2. As illustrated in FIG. 2, a clearance Y is provided between an axially inner end surface 33 (hereinafter simply referred to as "inner end surface 33") of each spherical roller 3 and an axially inner side surface 63 (hereinafter simply referred to as "outer surface 63") of the guide ring 6. The clearances X, Y are clearances as viewed in the longitudinal section including a center line C of the spherical roller 3 and the axis O of the self-aligning roller bearing 10. In the longitudinal section, the outer end surface 34 of the spherical roller 3 and the inner surface 23a of the rib portion 23 are arranged in parallel with each other and the inner end surface 33 of the spherical roller 3 and the outer surface 63 of the guide ring 6 are arranged in parallel with each other. The relation of the clearances X and Y is shown in the following Equation (1).

$$X<Y \tag{1}$$

As illustrated in FIG. 2, a clearance Z is provided between each axially outer side surface 57 (hereinafter simply referred to as "outer surface 57") of the annular member 50 of the cage 5 and the corresponding ones of the inner end surfaces 33 of the spherical roller 3. In the longitudinal section, the inner end surface 33 of the spherical roller 3 and the outer surface 57 of the annular member 50 are arranged in parallel with each other. Thus, the outer surface 57 of the annular member 50 and the outer surface 63 of the guide ring 6 are arranged in parallel with each other.

The relation of the clearances Y and Z is shown in the following Equation (2).

$$Y<Z \tag{2}$$

Thus, the following relation is established based on Equations (1) and (2).

$$X<Y<Z \tag{3}$$

Figure 3:
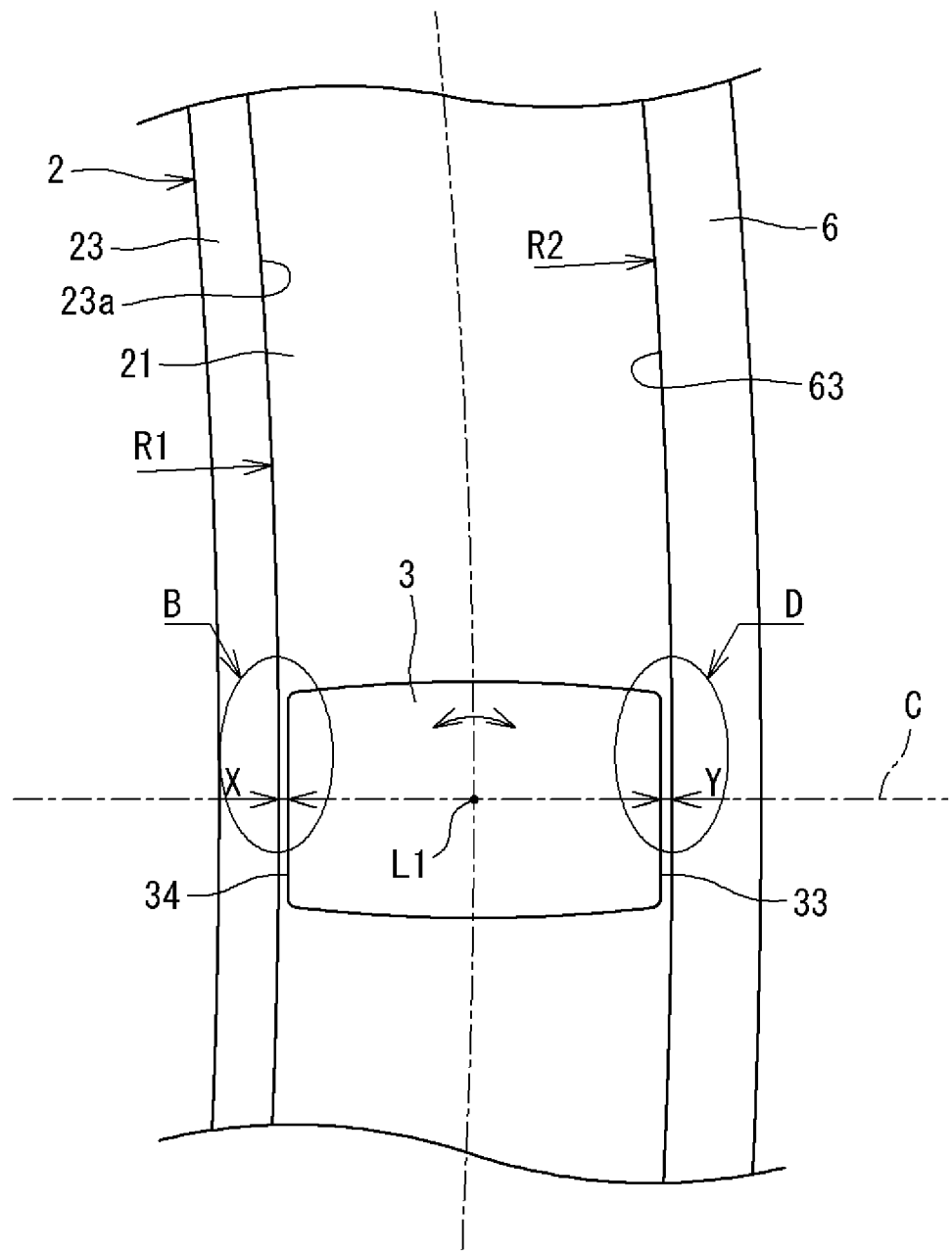
FIG. 3 is a view of a spherical roller, an inner ring, and the guide ring as viewed from a direction A along a virtual line L1 in FIG. 1.
Figure 5:
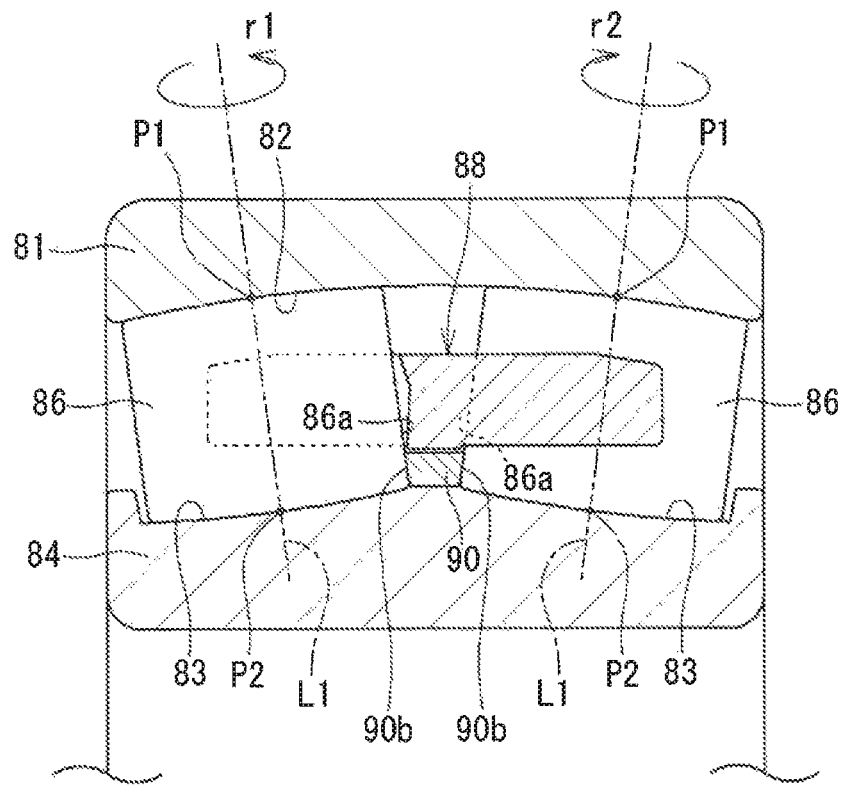
FIG. 5 is a longitudinal sectional view of a self-aligning roller bearing according to a related art.

The clearances X and Y have a relation as follows. FIG. 3 is a view of the spherical roller 3, the inner ring 2, and the guide ring 6 as viewed in a direction A along a virtual line L1 in FIG. 1. The inner surface 23a of the rib portion 23 is formed as an arc surface. Specifically, as illustrated in FIG. 1, the inner surface 23a of the rib portion 23 is formed as an arc surface centering on the intersection point (not illustrated) between the center line C of the spherical roller 3 and the axis O of the self-aligning roller bearing 10. An arc radius of the inner surface 23a of the rib portion 23 is indicated by R1.

The outer surface 63 of the guide ring 6 is also formed as an arc surface centering on the intersection point (not illustrated) between the center line C of the spherical roller 3 and the axis O of the self-aligning roller bearing 10. An arc radius of the outer surface 63 of the guide ring 6 is indicated by R2.

As illustrated in FIG. 3, the outer end surface 34 and the inner end surface 33 of the spherical roller 3 are each formed as a flat surface. Thus, the clearance between the rib portion 23 and the spherical roller 3 and the clearance between the guide ring 6 and the spherical roller 3 vary in the circumferential direction. The above mentioned clearances X and Y indicate the clearances as viewed in the longitudinal section including the center line C of the spherical roller 3. As the spherical roller 3 extends away from the center line C in the circumferential direction, the clearance between the spherical roller 3 and the rib portion 23 increases and the clearance between the spherical roller 3 and the guide ring 6 decreases.

FIG. 4A is a view illustrating a variation in a clearance between the spherical roller 3 and the rib portion 23 in a portion B in FIG. 3. A clearance x at a position further offset from the center line C of the spherical roller 3 in the circumferential direction between the spherical roller 3 and the rib portion 23 is larger than the clearance X between the spherical roller 3 and the rib portion 23 on the center line C. The clearance x is largest at a position offset, from the center line C of the spherical roller 3 in the circumferential direction, by a radius R3 of the outer end surface 34 of the spherical roller 3. The difference between clearances x and X, that is, the amount of variation in clearance between the spherical roller 3 and the rib portion 23 is indicated as S1 in FIG. 4A.

FIG. 4B is a view illustrating a variation in the clearance between the spherical roller 3 and the guide ring 6 in a portion D in FIG. 3. A clearance y at a position further offset from the center line C of the spherical roller 3 in the circumferential direction between the spherical roller 3 and the guide ring 6 is smaller than the clearance Y between the spherical roller 3 and the guide ring 6 on the center line C. The clearance y is smallest at a position offset, from the center line C of the spherical roller 3 in the circumferential direction, by the radius R3 of the inner end surface 33 of the spherical roller 3. The difference between clearances Y and y, that is, the amount of variation in clearance between the spherical roller 3 and the guide ring 6 is indicated as S2 in FIG. 4B.

As illustrated in FIG. 4C, at the position offset by the radius R3 from the center line C in the circumferential direction, that is, at outer peripheral edges of end surfaces 33 and 34 of the spherical roller 3, a difference ΔS is provided between the variation amount S1 of the clearance between the spherical roller 3 and the rib portion 23 and the variation amount S2 of the clearance between the spherical roller 3 and the guide ring 6. In the present embodiment, the relation between the clearances X and Y is set as the following Equation (5) in consideration of the difference ΔS between the variation amounts S1 and S2.

$$X < Y - \Delta S \quad (4)$$

Next, the operations and advantageous effects of the present embodiment will be described.

In the present embodiment, the clearance X between the end surface 34 of the spherical roller 3 and the rib portion 23 and the clearance Y between the end surface 33 of the spherical roller 3 and the guide ring 6 have the relation expressed above in Equation (1). Conventionally, the clearance X between the end surface 34 of the spherical roller 3 and the rib portion 23 and the clearance Y between the end surface 33 of the spherical roller 3 and the guide ring 6 have a relation of Y<X.

As illustrated in FIG. 1, in the self-aligning roller bearing 10 according to the present embodiment when the spherical rollers 3 rotate about the virtual lines L1 that pass through contact points P1 and P2 at which the spherical rollers 3 contact the outer raceway surface 11 and the inner raceway surfaces 21, that is, when the spherical rollers 3 are skewed, the spherical rollers 3 are less likely to contact the guide ring 6 compared to the related art due to the relation expressed in Equation (1). In contrast, the spherical rollers 3 are more likely to contact the rib portions 23 due to the relation expressed in Equation (1). The guide ring 6 is formed of a material with hardness lower than that of the spherical rollers 3. Thus, causing the spherical rollers 3 to be less likely to contact the guide ring 6 suppresses wear of the guide ring 6. This can prevent adverse effect to the service life of the bearing caused by wear debris of the guide ring 6 adhering to the raceway surfaces 11 and 21, or the like. The rib portions 23 are formed of the same material as the spherical rollers 3. Thus, it is not particularly a problem even if the spherical rollers 3 are more likely to contact the rib portions 23.

In the present embodiment, the clearance X between the end surface 34 of the spherical roller 3 and the rib portion 23 and the clearance Y between the end surface 33 of the spherical roller 3 and the guide ring 6 have a relation as expressed in Equation (4), in addition to the relation expressed in Equation (1). In Equation (4), the relation of the clearances X and Y are set in consideration of the arc shape of the inner surface 23a of the rib portion 23 and the arc shape of the outer surface 63 of the guide ring 6. That is, the clearance between the spherical roller 3 and the rib portion 23 increases as the spherical roller 3 extends away from the center line C of the spherical roller 3 in the circumferential direction. In contrast, the clearance between the spherical roller 3 and the guide ring 6 decreases as the spherical roller 3 extends away from the center line C of the spherical roller 3 in the circumferential direction. With only the relation expressed in Equation (1), therefore, the clearance between the spherical roller 3 and the guide ring 6 may be smaller than the clearance between the spherical roller 3 and the rib portion 23 at a position further offset from the center line C of the spherical roller 3 in the circumferential direction. The Equation (4) takes into consideration the difference ΔS of the variation amount of the clearance between the spherical roller 3 and the rib portion 23 and the clearance between the spherical roller 3 and the guide ring 6. Accordingly, the clearance between the spherical roller 3 and the rib portion 23 is always smaller than the clearance between the spherical roller 3 and the guide ring 6. This can significantly reduce the possibility of the spherical roller 3 contacting the guide ring 6 even when the spherical roller 3 is skewed.

The difference ΔS between the variation amounts S1 and S2 illustrated in FIG. 4C has the dimension such that the variation amount S1 of the clearance between the spherical roller 3 and the rib portion 23 has the largest value possible and the variation amount S2 of the clearance between the spherical roller 3 and the guide ring 6 has the largest value possible. That is, the same effect can be achieved even if the height of the rib portion 23 or the guide ring 6 (see FIG. 1) reaches the center line C of the spherical roller 3. However, the actual heights of the rib portion 23 and the guide ring 6 are lower than the center line C. The difference ΔS illustrated in FIG. 4C can therefore be considered as a dimension set with a margin, further preventing the skewed spherical roller 3 from contacting the guide ring 6. Note that the dimension of the difference ΔS may be set in consideration of the actual heights of the rib portion 23 and the guide ring 6.

Due to the relation in the Equation (2), the spherical roller 3 is more likely to contact the guide ring 6 than contact the annular member 50 of the cage 5. In many cases, the cage 5 is formed of a material with hardness lower than that of the guide ring 6, such as brass. Due to the relation in the Equation (2), the spherical roller 3 is less likely to contact the annular member 50 of the cage 5, thereby suppressing wear of the cage 5, or the like.

The present invention is not limited to the embodiments described above, and may be implemented in various other embodiments within the scope of the claims. For example, the outer surface 57 of the annular member 50 of the cage 5 may not necessarily be in parallel with the inner end surface 33 of the spherical roller 3. In this case, the value of the clearance Z may represent the smallest clearance between the outer surface 57 of the annular member 50 of the cage 5 and the inner end surface 33 of the spherical roller 3.

According to the present invention, spherical rollers contacting the guide ring due to the spherical rollers being skewed can be suppressed.

What is claimed is:

1. A self-aligning roller bearing comprising:
    an outer ring having an outer raceway surface that is a recessed curve on an inner periphery of the outer ring;
    an inner ring having two rows of inner raceway surfaces that are recessed curves side by side on an outer periphery of the inner ring and having a rib portion at each axially outward end;
    a plurality of spherical rollers disposed between the outer raceway surface and the inner raceway surface in two rows side by side;
    a cage having a plurality of pockets that accommodate the spherical rollers to hold each row of the spherical rollers at intervals in a circumferential direction; and
    a guide ring disposed between the cage and the inner ring as well as between the two rows of the spherical rollers, wherein
    in a longitudinal section viewed from a direction perpendicular to a center line of one of the plurality of spherical rollers and directed toward an axis of the self-aligning roller bearing, a clearance X between an outer end surface of the spherical roller on an axially outer side of the self-aligning roller bearing and the rib portion, and a clearance Y between an inner end surface of the spherical roller on an axially inner side of the self-aligning roller bearing and the guide ring have a relation of $X<Y-\Delta S$, where $\Delta S$ is a difference between S1 and S2, S1 is a difference between (i) a clearance between an axially inner side surface of the rib portion and the outer end surface of the spherical roller that faces the axially inner side surface at the center line and (ii) a clearance between an axially inner side surface of the rib portion and the outer end surface of the spherical roller that faces the axially inner side surface at a radial distance from the center line in the circumferential direction, and S2 is a difference between (i) a clearance between an axially outer side surface of the guide ring and the inner end surface of the spherical roller that faces the axially outer side surface at the center line and (ii) a clearance between an axially outer side surface of the guide ring and the inner end surface of the spherical roller that faces the axially outer side surface at the center line at the radial distance from the center line in the circumferential direction, and
    in the longitudinal section, the inner side surface of the rib portion is formed as an arc surface, and the outer side surface of the guide ring is formed as an arc surface, and the outer end surface and the inner end surface of the spherical roller are each formed as a flat surface.

2. The self-aligning roller bearing according to claim 1, wherein
    the cage includes an annular member disposed radially outward of the guide ring as well as between the two rows of the spherical rollers, and
    in the longitudinal section including the center line of the spherical roller and the axis of the self-aligning roller bearing, when a clearance between an axially outer side surface of the annular member and the inner end surface of the spherical roller is regarded as a clearance Z, the clearances Y and Z have a relation of $Y<Z$.

* * * * *